US007287687B2

(12) United States Patent
Vercnocke et al.

(10) Patent No.: US 7,287,687 B2
(45) Date of Patent: Oct. 30, 2007

(54) SYSTEM AND METHOD FOR REGULATING ALCOHOL CONSUMPTION

(75) Inventors: Geoffrey A. Vercnocke, Clinton Township, MI (US); Daniel S. Vergote, New Baltimore, MI (US)

(73) Assignee: I.C.A.R.D., L.L.C., Troy, MI (US)

( * ) Notice: Subject to any disclaimer, the term of this patent is extended or adjusted under 35 U.S.C. 154(b) by 226 days.

(21) Appl. No.: 11/085,986

(22) Filed: Mar. 22, 2005

(65) Prior Publication Data

US 2006/0217932 A1 Sep. 28, 2006

(51) Int. Cl.
*G06F 17/00* (2006.01)

(52) U.S. Cl. ........................................ 235/375; 385/493

(58) Field of Classification Search ................ 235/493, 235/375; 702/28, 187
See application file for complete search history.

(56) References Cited

U.S. PATENT DOCUMENTS

| | | | |
|---|---|---|---|
| 4,463,098 A | 7/1984 | Hoberman | |
| 4,632,428 A | 12/1986 | Brown | |
| 4,770,996 A | 9/1988 | Tabakoff | |
| 4,822,988 A | 4/1989 | Gloton | |
| 5,049,728 A | 9/1991 | Rovin | |
| 5,066,583 A | 11/1991 | Mueller | |
| 5,880,445 A * | 3/1999 | Mori et al. | 235/380 |
| 5,974,124 A | 10/1999 | Schlueter, Jr. et al. | |
| 6,017,308 A * | 1/2000 | Fults | 600/300 |
| 6,113,538 A | 9/2000 | Bowles et al. | |
| 6,421,650 B1 | 7/2002 | Goetz et al. | |
| 6,454,708 B1 | 9/2002 | Ferguson et al. | |
| 6,557,752 B1 | 5/2003 | Yacoob | |
| 6,679,425 B1 * | 1/2004 | Sheppard et al. | 235/382 |
| 6,708,893 B2 | 3/2004 | Erfani et al. | |
| 7,163,146 B2 * | 1/2007 | Demere | 235/381 |

FOREIGN PATENT DOCUMENTS

| | | |
|---|---|---|
| WO | WO 0186463 A2 * | 11/2001 |
| WO | WO 01/93756 | 12/2001 |
| WO | WO 02/081015 | 10/2002 |
| WO | WO 03/056491 | 7/2003 |

* cited by examiner

*Primary Examiner*—Seung Ho Lee
(74) *Attorney, Agent, or Firm*—Warner Norcross & Judd LLP

(57) ABSTRACT

A system and method for regulating alcohol consumption includes an ID tag having a unique ID for a person. When a person desires to purchase an alcoholic beverage, the ID tag is scanned or read by a reader. Information relating to prior purchases of alcoholic beverages are retrieved. An anticipated blood alcohol level is calculated based upon the current order and previous orders of alcoholic beverages. If the blood alcohol level of the user is anticipated to exceed a threshold, then sales of alcohol beverage are declined.

22 Claims, 2 Drawing Sheets

SYSTEM AND METHOD FOR REGULATING ALCOHOL CONSUMPTION

BACKGROUND OF THE INVENTION

Many people consume alcoholic beverages. However, the excessive consumption of alcoholic beverages can be a significant problem. An inebriated person may sometimes act inappropriately and become a nuisance. In some situations, such as the operation of a motor vehicle, the inebriated person may create a serious danger to himself and other persons.

Current attempts to limit the consumption of alcohol generally relate to penalties after the person has become inebriated. For example, a person can be incarcerated or fined for public drunkenness or operating a motor vehicle under the influence of alcohol. However, these punishments are imposed after the person has consumed too much alcohol.

Attempts to stop a person from becoming inebriated are generally ineffective. Usually, a server or bartender is expected to refuse providing an individual with an alcoholic beverage if that individual is inebriated. However, the ability of the server to ascertain the inebriation of the individual is limited by several factors. The server may not be have experience in detecting whether a person is inebriated. The server also may have only a limited amount of time to interact with the person. Finally, an inebriated person may be able to appear normal even if he has consumed an excessive amount of alcoholic beverages.

The failure to limit the consumption of alcoholic beverages has a detrimental affect not only upon the person consuming the beverage, but also on the establishment serving the liquor. Inebriated persons tend to create adverse situations at the establishment, thereby resulting in other customers leaving the establishment, and thereby reducing the sales of alcoholic beverages by the establishment. In severe cases, the establishment that provided alcoholic beverages to a person may itself be held liable for injuries resulting from that person's inebriation.

Thus, an improved method to limit the alcohol consumption by an individual is highly desirable.

SUMMARY OF THE INVENTION

A system for regulating the alcohol consumption of a user includes a personal ID tag. The personal ID tag includes a personal ID. The personal ID tag could be a swipe card, a smart card, a drivers license, a wristband, or any item that could contain an ID.

In order to obtain a tag, a person could be required to provide personal information such as height, weight and gender. The person could also be required to submit to a controlled blood alcohol test. In this situation, the person consumes a specific alcoholic beverage at specified time intervals. The person's blood alcohol is periodically checked and recorded. Thus, the reaction of the person to the consumption of alcohol is recorded. The results of the test could then be used to make more accurate determinations of blood alcohol levels for the person.

When a person orders an alcoholic beverage, the ID on the personal ID tag is read by a reader. Information regarding the owner of the ID is retrieved and displayed in order to verify that the person presenting the ID tag is in fact the person associated with the ID. If so, then information regarding prior alcoholic beverage orders by the owner is retrieved.

Based upon the information regarding the prior alcoholic beverage orders as well as the current order, a computer calculates the anticipated blood alcohol level. If the anticipated blood alcohol level exceeds a threshold, then the order is not fulfilled. If the anticipated blood alcohol level does not exceed the threshold, then the order is fulfilled, and information regarding the newly fulfilled order is stored in a database for later reference if the ID owner again places an order for alcoholic beverages.

The information regarding alcoholic beverage sales could be stored by the reader, or it could be stored in a computer located near the reader. Additionally, a central computer could be provided in order to upload information regarding alcoholic beverage sales so that all orders by the owner can be tracked. For example, if the owner were at an amusement park where a single proprietor was responsible for all the places where alcoholic beverages are sold, the proprietor could track all alcohol orders by a person, and thus limit the supply of alcohol to that person if the person is in danger of consuming too much alcohol.

By limiting the ability of a person to consume excessive amounts of alcohol, the person's sobriety can be assured. The problems associated with excessive alcohol consumption are thereby ameliorated.

These and other objects, advantages and features of the invention will be more readily understood and appreciated by reference to the detailed description of the drawings.

DETAILED DESCRIPTION OF THE DRAWINGS

Figure 1:
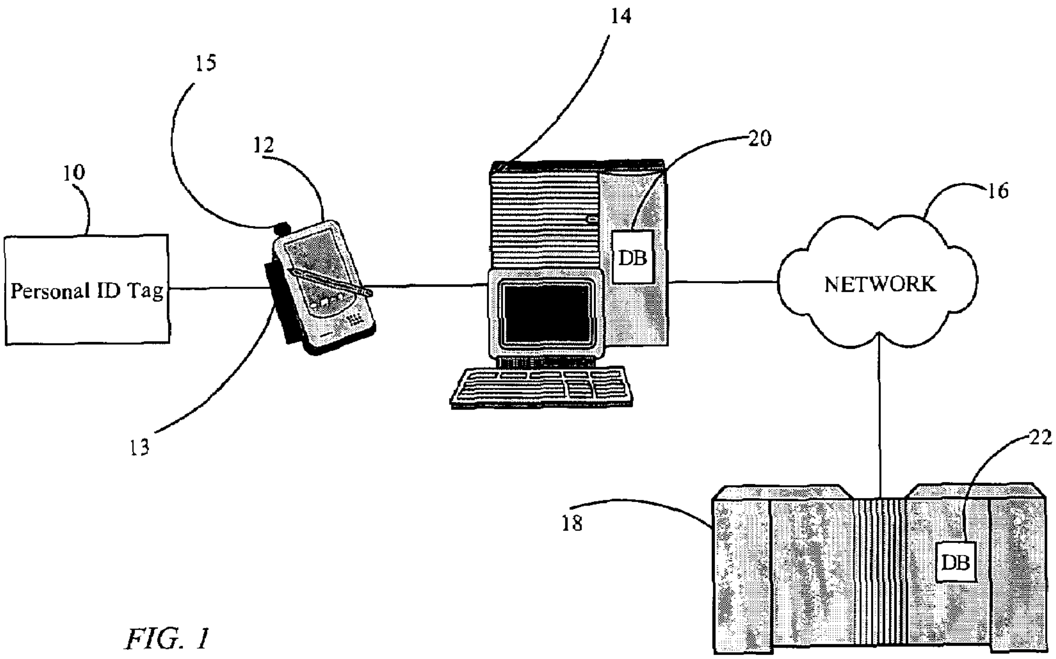
FIG. 1 is a system for monitoring the alcohol consumption of an individual.

FIG. 1 shows a system for monitoring the alcohol consumption of a person. Personal ID tag 10 could be a smart card, a swipe card, an RFID tag, a hand stamp with a unique ID number, or any other means for uniquely and securely identifying an individual. For example, the user could be provided with a wrist band having a unique ID. Or, if a drivers license were provided with a bar code indicative of a unique ID, the drivers license could be used.

A person presents the personal ID tag 10 whenever he desires to purchase an alcoholic beverage. When the order for an alcoholic beverage is presented, the tag is read by way of reader 12. Reader 12 is shown as a PDA (personal digital assistant) with swipe card reader 13. However, reader 12 could be any one of numerous devices for reading tags, such as a laser scanner. Alternatively, the information from personal ID tag 10 could be manually entered into reader 12. Reader 12 is provided with alert 15. When activated, alert 15 signals that the order should not be completed.

Reader 12 is connected to establishment computer 14. Establishment computer 14 is connected by way of network 16 to central computer 18. Establishment computer 14 has establishment database 20. Establishment database 20 contains a plurality of unique IDs associated with specific customers. Establishment database 20 could also contain a picture of the individual associated with the unique identification number or other information allowing the person serving the alcoholic beverage to verify the identity of the person ordering the beverage. Similarly, central computer 18 could have central computer database 22.

Central computer 18 could be for a particular locale or group of establishments. For example, if the establishments were part of an amusement park or a sports complex, all places which serve alcoholic beverages within the amusement park or sports complex would be connected to central computer 18. Alternatively, the central computer 18 could also be located with a local or state government.

Central computer database 22 could have information similar to that of establishment database 20, or it could have more detailed information about the user. For example, central computer database 22 could contain information about previous events involving the user which might indicate that the user should not be provided with alcoholic beverages.

In order to obtain personal ID tag 10, an individual may be required to engage in a test. The individual would be provided a specific alcoholic beverage at regular intervals over a period of time. A blood alcohol test, such as a breathalyzer test, would be administered to the person. The blood alcohol level shown for each test would be recorded and stored either on personal ID tag 10, establishment computer 14, or central computer 18. The height, weight and gender of the person taking the test would also be stored.

For example, a person could be asked to consume two beers each hour. At the end of each hour, a breathalyzer test would be performed. At the end of four hours, the results of each test would be recorded. The person would thus be provided with specific information regarding the effect of alcohol consumption on him. Additionally, that information would be available for use at a later time to assist in determining whether additional sales of an alcoholic beverage is prudent.

Figure 2:
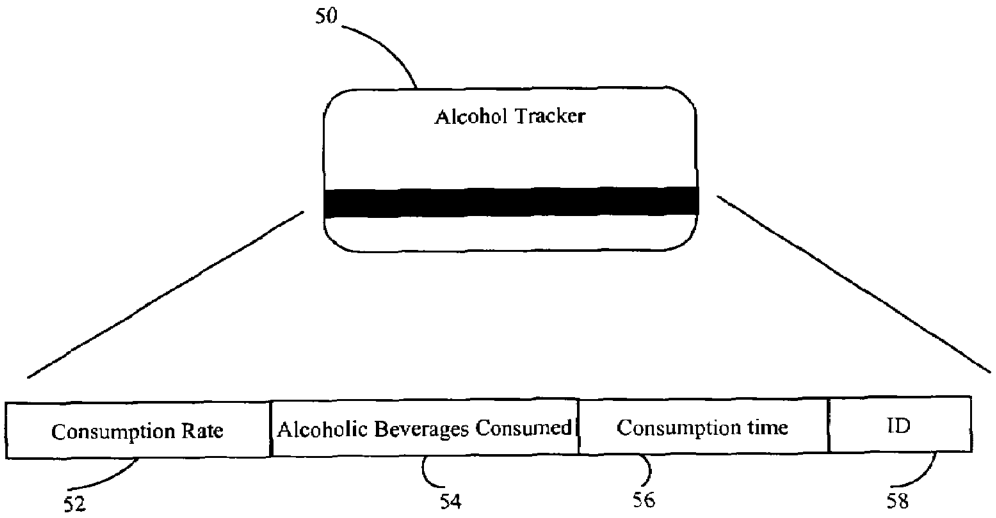
FIG. 2 shows a memory device containing alcohol consumption information.

FIG. 2 shows a memory device containing alcohol consumption information. Memory device 50 as shown is a magnetic swipe card. However, memory device 50 could be a card having a semiconductor memory, such as a smart card, or any other device which allows the storage and retrieval of information regarding the consumption of alcoholic beverages.

Memory device 50 could have three fields. Consumption rate field 52 contains the rate of alcoholic consumption for a user. For example, if a user can consume two ounces of an alcoholic beverage per hour, then the rate recorded would be "two." Obviously, other schemes could be used to identify the acceptable rate of consumption. Consumption rate field 52 is written only once. Alcohol beverages consumed field 54 is a field containing the amount of alcoholic beverages consumed. With each use of the card, the alcohol beverages consumed field 54 is changed to indicate the amount consumed. Depending upon the memory available on memory device 50, the alcoholic beverages consumed field could include a running total of beverages consumed, or it could contain a list of each beverage consumed. Finally, consumption time field 56 contains the time of the consumption of the alcoholic beverages. Consumption time field 56 could include a time entry for every alcoholic beverage consumed or it could include only the time of the last alcoholic beverage consumed. ID field 58 includes a unique ID for a user.

Figure 3:
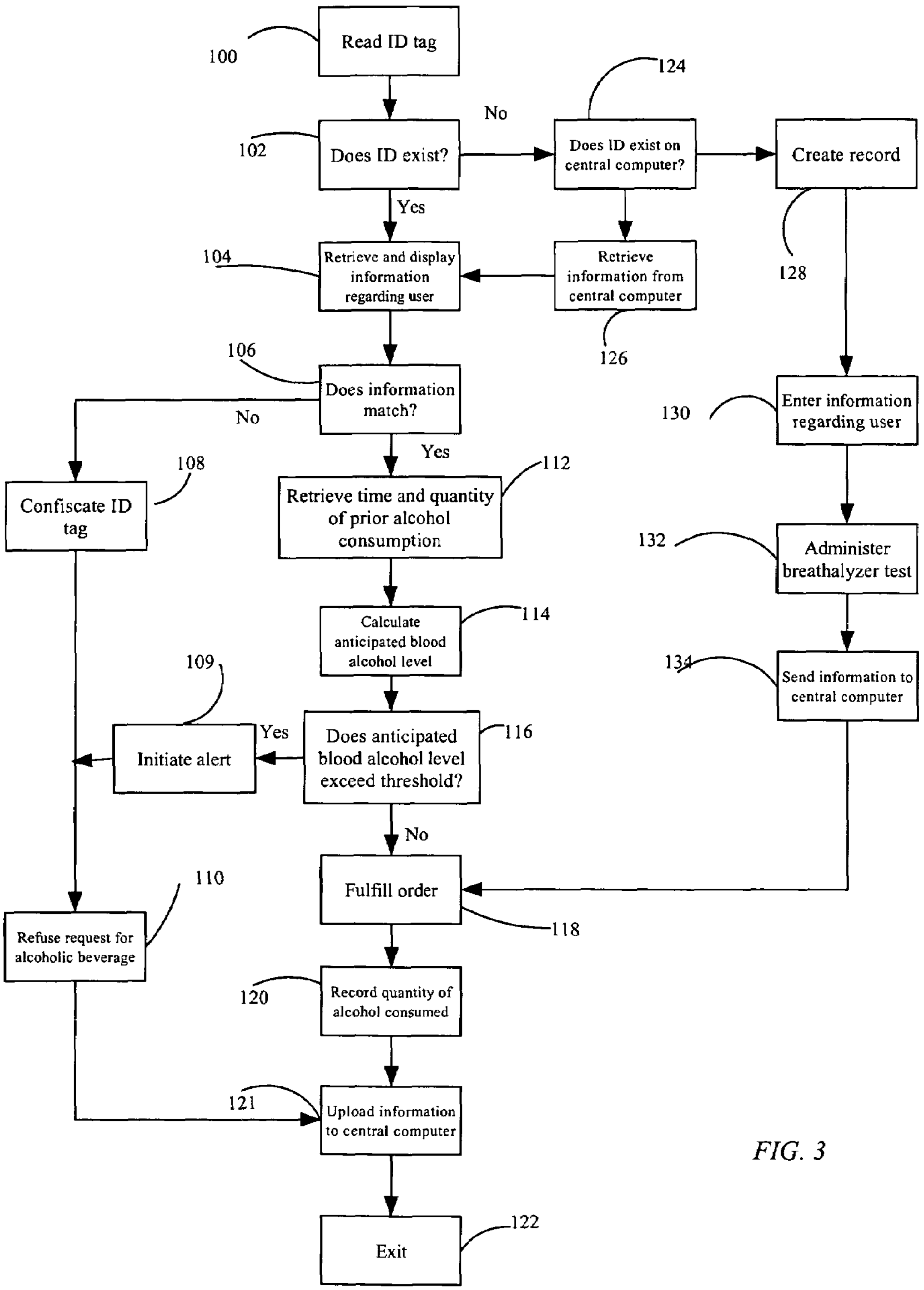
FIG. 3 is a method for operating the system shown in FIG. 1.

FIG. 3 shows a method for operation of the system for regulating alcohol consumption of a person. A person first presents ID tag 10 in order to obtain an alcoholic beverage. ID tag 10 is then read.

The reading of ID tag 10 supplies a unique ID to establishment computer 14. Step 100. Establishment computer 14 determines if the unique identification number currently exists. Step 102. If so, establishment computer 14 retrieves from establishment database 20 information associated with the unique ID. Step 104.

At the same time, personal information regarding the user is displayed. Step 104. The information regarding the owner of the card is displayed. If the database contains a picture of the person using the card, then the picture could be retrieved and displayed. Step 106. If the information displayed does not match the person presenting the ID tag, the ID tag is confiscated, (step 108) and the request to purchase more alcoholic beverages is denied. Step 110

If, on the other hand, the information regarding the owner of the ID tag and the user of the ID tag does match, then various actions occur to determine whether alcoholic beverages should be provided to the user. In one embodiment, the time and quantity of previous alcoholic beverages orders are retrieved. Step 112. Using this information as well as personal information about the user, such as the user's weight and gender and the results of any tests regarding alcohol consumption on the specific user, the establishment computer can calculate the anticipated blood alcohol level of the user if he is provided the ordered alcoholic beverage. Step 114. For example, if the calculated blood alcohol content of the user, based upon the time and quantity of previous orders of alcohol, is 0.075%, then an order for an alcoholic beverage such as a 12 ounce serving of beer would raise the blood alcohol level of the user by an additional 0.02% to 0.095%.

Based upon this calculation of blood alcohol level, establishment computer 14 would then determine whether the blood alcohol level is above a threshold. Step 116. The predetermined threshold could be any amount. For example, if the user is expected to operate a motor vehicle, then the threshold could be at 0.08%, the level set by many governmental units as being an unacceptable blood alcohol level for operating a motor vehicle. On the other hand, if the user was not expected to operate a motor vehicle, then the blood alcohol level could be higher. Conversely, if the user was a 'designated driver', the blood alcohol level could be much less than 0.08%.

If the blood alcohol level would exceed the threshold, then an alert would be initiated. Step 109. The user's request for the alcoholic beverage would be denied. Step 110. If the anticipated blood alcohol level would not exceed the threshold, then the user's request would be fulfilled. Step 118. The amount and type of alcoholic beverage as well as the time the order was fulfilled would be stored in establishment computer 14. Step 120. The information regarding the purchase of the alcoholic beverage would be uploaded to central computer 18. Step 121. The process would then terminate. Step 122.

Alternatively, in place of steps 112, 114, and 116, establishment computer 14 could simply calculate the number of drinks previously served to the user. Once the number of drinks served to a user reaches a threshold, no further drinks would be provided to the user.

Returning to Step 102, if no record exists for the unique ID, then establishment computer 14 determines if the unique ID exists at central computer 18. Step 124. If so, then the information is downloaded from central computer 18 to establishment computer 14. Step 126. If not, a new record is created. Step 128. Information about a user is then collected. Step 130. Such information could include the height and weight of the user and a picture of the user. Additionally, a breathalyzer test could be administered to the user. Step 132. The results of the breathalyzer test would then be stored in establishment computer 14. Once the information is recorded, all of the information in establishment computer 14 with respect to the user would then be uploaded to central computer 18. Step 134.

In this manner, the alcohol consumption by an individual could be limited to insure that he did not become impaired so as to present a threat to himself or others.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A system for regulating alcohol consumption of a user comprising:

a personal ID tag having a unique ID associated with the user;

a reader for reading the unique ID;

a first computer for recording an alcoholic beverage order of the user identified by the unique ID;

blood alcohol calculation means for approximating a blood alcohol level of the user based upon the alcoholic beverage order;

an alert for indicating that the user may exceed a threshold if the user consumes an alcoholic beverage;

a first database for storing the alcohol order by the user, the first database including personal information regarding the user; and a second computer for receiving from the first computer information regarding the alcoholic beverage order.

2. The system of claim 1 where the alert comprises an indicator proximal to the reader.

3. The system of claim 2 where the reader has a display, and the alert is shown on the display.

4. The system of claim 1 where the personal ID tag is a swipe card.

5. The system of claim 4 where the personal ID tag is a wrist band having an identification code therein.

6. The system of claim 5 where the personal information regarding the user includes information about gender and weight of the user.

7. The system of claim 6 where the personal information regarding the user includes a blood alcohol reading.

8. A method for regulating alcohol consumption by a user comprising:

providing the user with a unique ID;

storing a quantity of an alcoholic beverage ordered by the user;

calculating an anticipated blood alcohol level for the user based upon the quantity of the alcoholic beverage ordered by the user and upon personal information regarding the user; and refusing a sale of the alcoholic beverage if the anticipated blood alcohol level exceeds a threshold.

9. The method of claim 8 further comprising:

initiating an alert if the anticipated blood alcohol level exceed the threshold.

10. The method of claim 9 further comprising:

storing a time indicative of when the quantity of alcoholic beverage was ordered.

11. The method of claim 9 further comprising:

calculating the anticipated blood alcohol level based upon previous orders for alcoholic beverages by the user.

12. The method of claim 11 further comprising:

calculating the anticipated blood alcohol level based upon the time.

13. The method of claim 12 further comprising:

if the anticipated blood alcohol level does not exceed the threshold, completing the sale of the alcoholic beverage.

14. The method of claim 13 further comprising:

storing a quantity and a time of the sale for the alcoholic beverage.

15. The method of claim 14 further comprising:

storing a personal information regarding the user in a database.

16. The method of claim 15 where the step of calculating the anticipated blood alcohol level is based upon the personal information.

17. A method of regulating the alcohol consumption by a user comprising:

associating a plurality of unique IDs with a plurality of users;

providing the user with an ID tag having a first unique ID;

before fulfilling an order for an alcoholic beverage, reading the first unique ID;

attempting to match the first unique ID with one of the plurality of unique IDs;

if the first unique ID matches one of the plurality of unique IDs, then retrieving information about the user associated with that unique ID;

displaying the information;

verifying that the information for the user associated with the unique ID is that of the person presenting the ID tag;

if the person presenting the ID tag is the user associated with the unique ID, retrieving information regarding prior alcoholic beverage orders associated with the unique ID; and calculating an anticipated blood alcohol level for the user before the order for the alcoholic beverage is fulfilled.

18. The method of claim 17 further comprising:

if the person is identical to the user associated with the unique ID, then fulfilling the order for the alcoholic beverage.

19. The method of claim 17 further comprising:

if the anticipated blood alcohol level exceeds a threshold, then refusing to fulfill the order for the alcoholic beverage.

20. The method of claim 19 further comprising:

if the anticipated blood alcohol level does not exceed the threshold, then fulfilling the order for the alcoholic beverage.

21. The method of claim 20 further comprising:

storing in a database information regarding the order for the alcoholic beverage.

22. The method of claim 21 where the step of calculating the anticipated blood alcohol level includes using information regarding previous orders for alcoholic beverages.

* * * * *